Feb. 3, 1959 E. R. GUTZMER 2,871,572

PHOTO COMPOSING

Filed June 14, 1957

Inventor
Ernest R. Gutzmer
By Mann, Brown & McWilliams
Attorneys 2,871,572
Patented Feb. 3, 1959

2,871,572

PHOTO COMPOSING

Ernest R. Gutzmer, Hinsdale, Ill., assignor to Intercompany Corporation, Chicago, Ill., a corporation of Illinois Application June 14, 1957, Serial No. 665,838

8 Claims. (Cl. 33—184.5)

This invention relates to photo composing, as this is used in producing printing plates, and particularly the invention relates to the attainment of registry in group composition of color separation transparencies.

When color separation transparencies have been produced in respect to a plurality of different subjects by originally photographing the several subjects individually, the set of color separation transparencies, in respect to each of the subjects, is arranged in a registered relationship as by visual registration of the related transparencies, followed by the formation of registered openings therein and the placing of register pins in these openings.

The registered sets of color separation transparencies that are furnished to the photo composing room are usually in the form of screen or half tone transparencies, but where the subject is in the form of line drawings or the like to be printed in different colors, the sets of registered color separation transparencies may be continuous tone or unscreened in character. It may also be pointed out that the sets of color separation transparencies that are used may be either positives or negatives depending upon the type of printing plate or the method of plate production that is to be used.

The individual transparencies of the sets of color separation transparencies may, of course, be identically located on the respective printing plates, such as offset lithographic plates, through the use of a photo composing machine in which each transparency of each set is individually located, usually visually, and is then photographically printed on the sensitized coating of the related printing plate, but this is considered to be unduly costly because of the number of precise locating or visual registering operations that are required in the photo composing machine, and also because of the great amount of time required for individual exposure of each of the relatively small subjects on the printing plates.

In view of the limitations and costs that are thus involved, the common practice that has been followed in respect to group composition of color separation transparencies, has been to fix all of the related color separation transparencies of several individual subjects on a transparent carrier sheet which is relatively large. After exposure of the assembly or group on a plate, the transparencies relating to the one color are removed, and those relating to a second color are put in position on the carrier sheet. The process is repeated as to each color involved.

The group of individual subjects that are thus assembled on the carrier sheet to form an assembly allocated to a particular one of the different colors involved in the printing process, and each such assembly may, of course, be used to make a single exposure on a related printing plate where the assembly includes all of the subject matter that is to be included on such plate, but a more common use of such an assembly is in a step and repeat photo composing machine where multiples of the same group are provided or exposed on the same printing plate.

The location of the individual subjects on a carrier sheet is determined by accurate layout sheets that have markings thereon indicating the location of each individual subject that is to be included in the particular composition group, and the layout sheet is made up with register marks, and corresponding register marks are subsequently made on the transparent carrier sheet to facilitate registered location of the carrier sheet in the photo composing machine.

As a practical matter, in respect to a single color printing operation, the location of each subject of a group on a carrier sheet may, in most instances, vary within a fairly wide range of tolerance from the position indicated on the layout sheet, but in multi-color printing work the location of the corresponding color separation transparencies on the carrier sheet must correspond precisely with respect to the registry marks of the carrier sheet, and any variation from such precise location in one or more of the transparencies will produce improper registry in the final multi-color printed product.

In such use of these assemblies or carrier sheets in a photo composing machine, the carrier sheet is accurately located according to conventional methods in respect to the printing plate upon which it is to be exposed, and in related exposures, identical location of the carrier sheet in respect to the related printing plate may usually be attained in the machines now in use.

Experience has shown, however, that defects often result in the final multi-color printed product due to inability of the workmen in the photo composing room to locate all of the individual color separation transparencies of each subject in identical positions on the respective carrier sheets. In this respect it may be noted that the carrier sheets are provided with accurate register marks that are used to visually position the carrier sheets in respect to register marks or lines on the chase of the machine, to thus accurately locate and center the carriers on the chase. Failure to accurately center the work on the chase often causes lack of registry in the final printed material, but through special care in equipment maintenance and in the visual work positioning, lack of registry due to this phase of the operation may usually be avoided. It has been known, however, that the failure to attain registry of the printed colors in the final printed product may and often does result from inaccuracy of location of the individual color separation transparencies on and with respect to the related carrier sheets upon which they are mounted.

In view of the foregoing it is the primary object of the present invention to simplify the attainment of accurate registry where group composition is employed in respect to color separation transparencies, and an object related to the foregoing is to eliminate visual locating or positioning of the individual color separation transparencies on carrier sheets in connection with work of the aforesaid character.

Another and more specific object of the present invention is to enable precisely identical location of color separation transparencies on related carrier sheets to be attained mechanically so as to eliminate the errors inherent in visual positioning of the individual color separation transparencies on the respective carrier sheets.

Another object is to enable group composition of color separation transparencies to be accomplished in such a way that primary register openings provided in the layout sheets and carrier sheets have a continuing function throughout the layout, handling and use of the group assemblies to establish accurate relative positioning of the related color separation transparencies on the carrier sheets and to establish accurate location of the several transparencies in the photo composing machine.

Other and further objects of the present invention will be apparent from the following description and claims, and are illustrated in the accompanying drawing, which, by way of illustration, show a preferred method of accomplishing the objectives of the present invention and which demonstrate the principles thereof, and what is now considered to be the best mode in which to apply these principles. Variation may be made in the disclosed method, and equivalent principles may be used, and changes may be made as desired by those skilled in the art without departing from the invention.

In the drawing:

Figs. 1 to 4, respectively, illustrate separate mechanically registered sets of color separation transparencies that are to be utilized in group composition in producing the respective printing plates for multi-color reproduction of the individual subjects shown in the respective sets of transparencies.

Figures 1, 2, 3, 4, 5, 6, 7, 8, 9, 10, 11, 12:
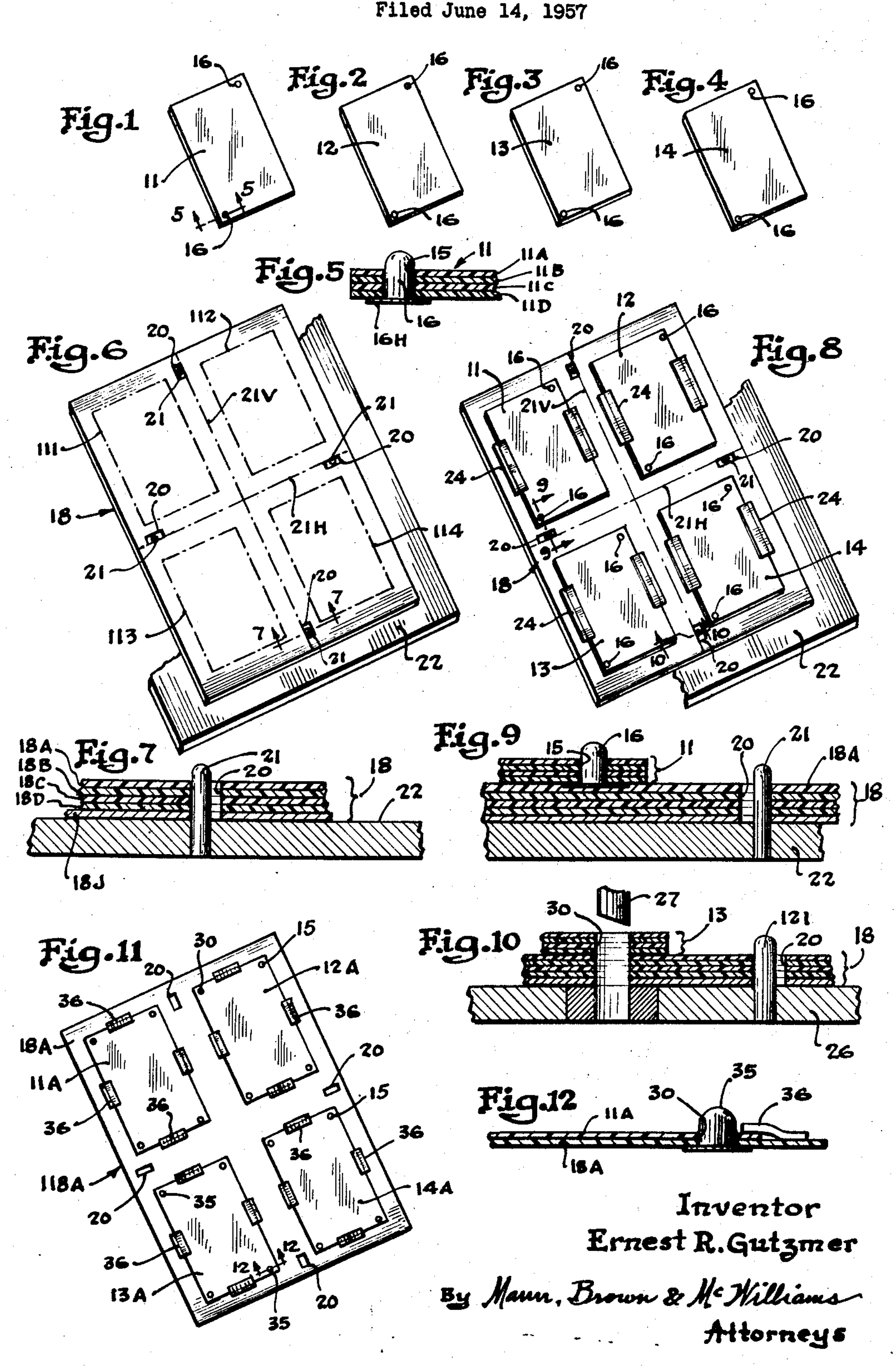
Fig. 5 is an enlarged cross-sectional view taken substantially along the line 5—5 and showing the mechanical registration of the transparencies of the sets.
Fig. 6 is a perspective view illustrating a set of sheets to be utilized in the photo composing process and including, in the present instance, four transparent carrier sheets and a paper layout sheet.
Fig. 7 is an enlarged fragmentary cross-sectional view illustrating the set of sheets of Fig. 6 in position on a work table, the view being taken substantially along the line 7—7 of Fig. 6.
Fig. 8 is a perspective view showing the sets of color separation transparencies mounted in position on the set of sheets shown in Fig. 6.
Fig. 9 is an enlarged fragmentary cross-sectional view taken substantially along the line 9—9 of Fig. 8.
Fig. 10 is an enlarged cross-sectional view taken in the position indicated by the line 10—10 of Fig. 8 but showing the sheets in a register punch with additional register openings formed through the transparent sheets and the sheets of Fig. 6.
Fig. 11 is a perspective view illustrating corresponding transparencies of the several sets mounted in position on the related one of the carrier sheets.
Fig. 12 is an enlarged fragmentary cross-sectional view illustrating the manner in which the individual transparencies are accurately located on the carrier sheet of Fig. 11, the view being taken substantially along the line 12—12 of Fig. 11.

For purposes of disclosure the various physical elements involved in the practice of the method of this invention have been disclosed in the drawing, and in Figs. 1 to 4, respectively, individual mechanically registered sets 11, 12, 13 and 14 have been illustrated, such registered sets of color separation transparencies representing the material that might be furnished to a photo composing room for multiple or group composition of the four individual subjects represented in the sets 11 to 14, respectively. Each set of color separation transparencies is herein illustrated as comprising four transparencies, which as to the set 11 are identified as transparencies 11A, 11B, 11C and 11D, as indicated in Fig. 5 of the drawing. The other sets 12, 13 and 14 also include four transparencies that may be identified by similar lettered suffixes. It will be recognized that different numbers of sets of transparencies may be grouped under this invention, and that the invention is not limited to four color work.

The transparencies of each set are furnished to the composing room in a mechanically registered set, and this may be accomplished in a known manner as by visually arranging the several transparencies of the set in register and then punching register openings 15 therein to receive register pins 16 that have relatively thin flat heads 16H thereon, as shown in Fig. 5.

When the color separation transparencies of the several sets 11 to 14 are to be arranged in a group for group composition on a photo composing machine, a layout sheet 18J is provided upon which the location of each of the subjects is indicated by suitable markings 111 to 114, as shown in Fig. 6, and under the present invention, the primary positioning or locating means that constitutes the fundamental basis for locaiton or centering of the group in the photo composing machine is provided by register openings 20 that are formed in the layout sheet 18J and which are also formed in a series of transparent carrier sheets 18A, 18B, 18C and 18D so that the several carrier sheets and the jig or layout sheet 18J may be registered as a group 18, as shown in Fig. 6, or may be accurately positioned individually through the use of register pins 21, and the register system that is thus used and which includes the register openings 20 and the register pins 21 is in accordance with the registry systems disclosed in the co-pending application of Franciszek Ozga, Serial No. 493,640, filed March 1, 1955, now issued as Patent No. 2,793,442, patented May 28, 1957. In the illustrated registry method flat sides on the registry pins 21 each engage one straight side of a registry opening 20, and these sides of the opening 20 are located on right angularly related lines 21V and 21H that pass through or define the centers of the sheets, thus to accurately locate the sheet center even though there may be some dimensional change in the sheet. It should be recognized, however, that under the present invention, other physical or mechanical register and locating systems may be employed.

Having been provided with a layout sheet or jig 18J with register openings 20 therein, the workman in the photo composing room arranges this layout sheet 18J face-up on a work table 22 having register pins 21 thereon, and on top of the layout sheet 18J the several carrier sheets 18A to 18D are mounted in a corresponding manner. The markings 111 to 114 on the layout sheet 18J are thus visible through the several carrier sheets 18A to 18D, and this relationship is illustrated in Fig. 6 of the drawing.

When the carrier sheets and the layout sheet have thus been arranged in a stack and in the desired predetermined relationship, the several mechanically registered sets 11 to 14 of color separation transparencies are placed in position on the top of the stack in the positions indicated by markings 111 to 114 of the layout sheet 18J. The several sets 11 to 14 are then secured in position on the uppermost carrier sheet 18A by pieces of a pressure sensitive tape 24 as indicated in Fig. 8 of the drawing. This positioning and fastening of the several sets 11 to 14 is performed while the work is on the work table 22 with the several carrier sheets 18A to 18D and the layout sheet 18J accurately related one to the other by the register pins 21 and the register openings 20. During the positioning and securing of the sets 11 to 14 on the top of the stacked carrier sheets, the register pins 16 remain in position in the several sets of transparencies and as illustrated in Fig. 9 in respect to the set 11, the thin head 16H of each pin being at this time located between the set of transparencies and the stack of carrier sheets.

After the location of the several sets 11 to 14 of transparencies has been established in respect to the sheet 18A and has been fixed by the application of the adhesive strips 24, the several carrier sheets 18A to 18D and the layout sheet 18J, as well as the several sets 11 to 14 carried on the upper carrier sheet 18A, are transferred to a register punch illustrated fragmentally in Fig. 10 as comprising a bed plate 26 that has register pins 121 therein that correspond with the register pins 21 of the table 22. All of the carrier sheets 18A to 18D and the layout sheet 18J are thus returned to their original accurate relationship with respect to each other, the transparent sheet 18A upon which the sets of transparencies 11 to 14 have been fixed being located at the top of the stack as indicated in Fig. 10. While the sets of transparencies and carrier sheets are thus accurately located one with respect to the other on the punch bed, the punch is operated so that the punching element or elements 27 punch aligned final register openings 30 through the sets of transparencies and the carrier sheets as well as the layout sheet 18J, and as will be evident in Fig. 11, two such final register openings 30 are formed in each set 11 to 14 of transparencies, these openings 30 being located at the two corners of these sets opposite the locations of the register pins 16.

Since all of the carrier sheets 18A to 18D are, at this time, located in a pre-determined relationship to each other, the formation of the final register openings 30 through the registered sets 11 to 14 and through the carrier sheets provides mechanical means whereby the position of individual ones of the transparencies may be accurately re-established in respect to the related ones of the carrier sheets.

Thus, after completion of the punching of the final registry openings 30, the sets of transparencies 11 to 14 are removed from the carrier sheet 18A by stripping off the securing tapes 24, and all of the carrier sheets 18A to 18D are removed from the punch to a final assembly table where the register pins 16 are removed and the transparencies pertaining to the several colors are separated so that they may be then placed in position on the related one of the carrier sheets, as indicated in Fig. 11 with respect to the transparencies 11A to 14A and the carrier sheet 18A. Thus the several transparencies are located on the carrier sheet 18A through the use of register pins 35 that are extended through the final register openings 30, as shown in Fig. 12, and when the transparencies have thus been accurately located, they are secured in position through the use of tape such as transparent Scotch tape 26, as shown in Figs. 11 and 12, to provide a group assembly 118A, and the pins 35 are removed so that the assembly is ready for use in the photo composing machine.

Assemblies related to the assembly 118A are similarly produced in respect to the other three carrier sheets 18B, 18C and 18D, thus to provide one group composition assembly for each of the several colors represented in the groups of transparencies. When the several group composition assemblies have thus been completed, the several transparencies relating to each subject are identically positioned on the related carrier sheets, and are also identically positioned with respect to the primary register openings 20 of the carrier sheets. Thus when these carrier sheets are placed successively in properly centered position on the photo composing machine, the several subjects of the group will be disposed in a particular location, and as to the respective transparencies of each subject, this location will be identical in each machine operation.

While the proper centered and aligned mounting of the carrier sheets in a vacuum frame, or on the chase of a photo composing machine could, of course, be accomplished visually according to known procedures, full realization of the advantages of the present invention dictates that the register openings 20 which have formed the initial basis for the location and mounting of the transparencies shall be used in accomplishing the location and mounting of the group assemblies in the photo composing machine. Thus, in accordance with the present invention the vacuum frame or the chase of the photo composing machine is provided with register pins formed and located in the same manner and relationship as that shown with respect to the pins 21 and 121. Thus, the respective group assemblies may be quickly and easily mounted in identical positions in the successive operations of the photo composing machine, and it may be observed that the register pins in this instance may be permanently mounted, or may be put in place only during the positioning operation while the carrier is being adhesively secured in the position thus established.

From the foregoing description it will be apparent that the present invention materially simplifies and reduces the cost of attaining accurate register in group compositions of color separation transparencies, and it will also be apparent that under the present method, the employment of visual methods of location is avoided not only in the location and mounting of the transparencies on carrier sheets, but also in the location and centering of the group composition assemblies in the photo composing machine.

It will also be apparent that the present invention enables primary register openings in carrier sheets to function throughout the entire process of producing the group compositions on the carriers and in the use of these group compositions in the exposure of the printing plates.

Thus while I have illustrated and described the preferred method in which the present invention may be carried out, it is to be understood that variations may be made by those skilled in the art without departing from the spirit and scope of the invention.

I claim:

1. In a group composition for producing registered sets of color printing plates, the method of producing multiple subject color separation assemblies which consists in forming correspondingly located primary register openings in a layout sheet and a plurality of transparent carrier sheets allocated respectively to the different colors to be printed, locating said sheets in a stacked registered relation as determined by the primary register openings therein with one of said carrier sheets on top of the stack and said layout sheet in a face-up relation, said layout sheet having layout markings and areas thereon allocated to the respective subjects to be included in the assemblies, locating and securing registered sets of color separation transparencies pertaining to the individual subjects on the top of the stack in accordance with the layout markings and in the areas allocated to the respective subjects, forming a plurality of final registry openings through each set of transparencies and the stack, separating the carrier sheets and the transparencies, locating the transparencies pertaining to each other on and in the related subject areas of the carrier sheets allocated to the respective colors, positioning the transparencies on such carrier sheets as determined by the final register openings of the carrier sheets and transparencies, and securing the transparencies in such positions on the respective carrier sheets to produce related multiple subject color separation assemblies in which the corresponding color separation transparencies pertaining to the several subjects are identically located with respect to each other and with respect to the primary register openings in the carrier sheets.

2. In the preparation of multiple-subject color separation assemblies for photo-composition production of registered sets of color printing plates, the method which consists in forming correspondingly located primary register openings in a layout sheet and a plurality of transparent carrier sheets allocated respectively to the different colors to be printed, locating said layout sheet and one of said carrier sheets in a stacked registered relation as determined by the primary register openings therein with the layout sheet face up and with said one of said carrier sheets on top of said layout sheet, said layout sheet having layout markings and areas thereon allocated to the respective subjects to be included in the assemblies, locating and securing registered sets of color separation transparencies pertaining to the individual subjects on the top of the said one carrier sheet in accordance with the layout markings and in the areas allocated to the respective subjects, locating all of said carrier sheets and said layout sheet in a punch in registered relation as determined by said primary register openings to provide a stack consisting of said layout sheet, all of said carrier sheets and said registered sets of transparencies secured on the uppermost one of said carrier sheets, forming a plurality of final registry openings through each set of transparencies and the sheets while thus positioned, separating the carrier sheets and the transparencies, locating the transparencies pertaining to each color on and in the related subject areas of the carrier sheets allocated to the respective colors, positioning the transparencies on such carrier sheets as determined by the final register openings of the carrier sheets and transparencies, and securing the transparencies in such positions on the respective carrier sheets to produce related multiple-subject color separation assemblies in which the corresponding color separation transparencies pertaining to the several subjects are identically located with respect to each other and with respect to the primary register openings in the carrier sheets.

3. In group photo composition, the method which includes the steps of forming corresponding primary register openings in a layout sheet and in a plurality of transparent carrier sheets allocated respectively to the different colors to be printed, locating said sheets in a stacked registered relation as determined by the primary register openings therein, said layout sheet having layout markings and areas thereon allocated to the respective subjects to be included in the group composition, locating and securing registered sets of color separation transparencies pertaining respectively to the individual subjects on the top of the stack in accordance with the layout markings and in the areas allocated to the respective subjects, forming a plurality of final registry openings through each set of transparencies and the stack while said sheets are maintained in registry as determined by said primary openings, separating the carrier sheets and the transparencies, locating the transparencies pertaining to each color on and in the related subject areas of the carrier sheets allocated to the respective colors, positioning the transparencies on such carrier sheets as determined by the final register openings of the carrier sheets and transparencies, and securing the transparencies in such positions on the respective carrier sheets to produce related multiple-subject color separation assemblies in which the corresponding color separation transparencies pertaining to the several subjects are identically located with respect to each other and with respect to the primary register openings in the carrier sheets.

4. In group photo composition, the method which includes the steps of forming corresponding primary register openings in a layout sheet and in a plurality of transparent carrier sheets allocated respectively to the different colors to be printed, locating said sheets in a stacked registered relation as determined by the primary register openings therein, said layout sheet having layout markings and areas thereon allocated to the respective subjects to be included in the group composition, locating and securing registered sets of color separation transparencies pertaining respectively to the individual subjects on the top of the stack in accordance with the layout markings and in the areas allocated to the respective subjects, forming a plurality of final registry openings through each set of transparencies and the stack while said sheets are maintained in registry as determined by said primary register openings, separating the carrier sheets and the transparencies, locating the transparencies pertaining to each color on and in the related subject areas of the carrier sheets allocated to the repective colors, positioning the transparencies on such carrier sheets as determined by the final register openings of the carrier sheets and transparencies, securing the transparencies in such positions on the respective carrier sheets to produce related multiple-subject color separation assemblies in which the corresponding color separation transparencies pertaining to the several subjects are identically located with respect to each other and with respect to the primary openings in the carrier sheets, and utilizing said primary registry openings to successively locate said assemblies in a photo composing machine for exposing the related printing plates.

5. The photo composing of multiple-subject color printing work, the method which consists in forming correspondingly located primary register openings in a layout sheet and a plurality of transparent carrier sheets allocated respectively to the different colors to be printed, locating said layout sheet and said carrier sheets in a stacked registered relation as determined by the primary register openings therein with the layout sheet face-up and with said carrier sheets on top of said layout sheet, said layout sheet having layout markings and areas thereon allocated to the respective subjects to be included in the assemblies, locating and securing registered sets of color separation transparencies pertaining to the individual subjects on the top of the top one of said carrier sheets in accordance with the layout markings and in the areas allocated to the respective subjects, locating all of said carrier sheets and said layout sheet in a punch in registered relation as determined by said primary register openings to provide a stack consisting of said layout sheet, all of said carrier sheets and said registered sets of transparencies secured on the uppermost one of said carrier sheets, forming a plurality of final registry openings through each set of transparencies and all of said sheets while thus positioned, separating the carrier sheets and the transparencies, locating the transparencies pertaining to each color on and in the related subject areas of the carrier sheets allocated to the respective colors, positioning the transparencies on such carrier sheets as determined by the final register openings of the carrier sheets and transparencies, and securing the transparencies in such positions on the respective carrier sheets to produce related multiple-subject color separation assemblies in which the corresponding color separation transparencies pertaining to the several subjects are identically located with respect to each other and with respect to the primary register openings in the carrier sheets, and utilizing said primary register openings to locate and center the respective assemblies successively in a photo composing machine.

6. In group photo composition for multi-color printing, the method which includes the steps of establishing identical primary register surfaces on a plurality of transparent carrier sheets allocated to the respective colors to be printed, placing said carrier sheets in a registered stack as determined by said primary register surfaces, locating a plurailty of registered sets of color separation transparencies relating respectively to different subjects on the top of the stack in the position desired in the group composition, securing said sets in said positions, locating said sheets in a similarly registered stack in a punch and punching pairs of final register openings through the sheets and the sets to establish a common register relation therebetween, separating the individual sheets and transparencies, locating the transparencies pertaining to each color on the respective carrier sheets allocated to such colors and in final positions determined by the final register openings and securing said transparencies in said final positions on said sheets.

7. In a group photo composition for multi-color printing, the method which includes the steps of establishing identical primary register surfaces on a plurality of transparent carrier sheets allocated to the respective colors to be printed, placing said carrier sheets in a registered stack as determined by said primary register surfaces, locating a plurality of registered sets of color separation transparencies relating respectively to different subjects on the top of the stack in the position desired in the group composition, securing said sets in said positions, locating said sheets in a similarly registered stack in a punch and punching pairs of final register openings through the sheets and the sets to establish a common register relation therebetween, separating the individual sheets and transparencies, locating the transparencies pertaining to each color on the respective carrier sheets allocated to such colors and in final positions determined by final register pins placed in the final register openings, taping said transparencies in such final positions, and removing the final register pins.

8. In group photo composition for multi-color printing, the method which includes the steps of establishing identical primary register surfaces on a plurality of transparent carrier sheets allocated to the respective colors to be printed, placing said carrier sheets in a registered stack as determined by said primary register surfaces, locating a plurality of registered sets of color separation transparencies, that relate respectively to different subjects and which are held in registered relation in the sets by mechanical register means, on the top of the stack in the position desired in the group composition, securing said sets in said positions, locating said sheets in a similarly registered stack in a punch and punching a pair of final register openings through each of the sets and through all of the sheets to establish a common register relation therebetween, separating the individual sheets, and removing the mechanical register means from said sets and separating the transparencies, locating the transparencies pertaining to each color on the respective carrier sheets allocated to such colors and in final positions determined by mechanical register means placed in the final register openings, securing said transparencies in said final positions on said sheets, and removing said last mentioned mechanical register means.

References Cited in the file of this patent

UNITED STATES PATENTS

| | | |
|---|---|---|
| 2,682,463 | Olsen | June 29, 1954 |
| 2,688,194 | Jordan | Sept. 7, 1954 |
| 2,793,442 | Ozga | May 28, 1957 |